INVENTOR:
JOHN R. GROBERG.
BY:
MALLINCKRODT & MALLINCKRODT

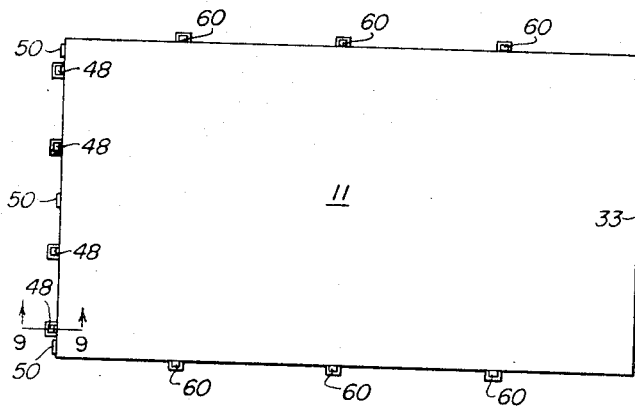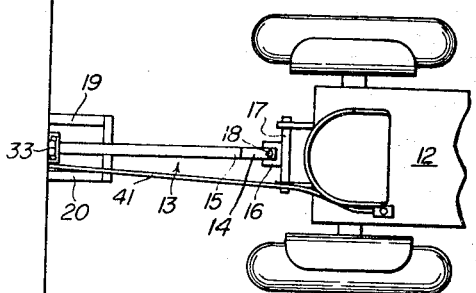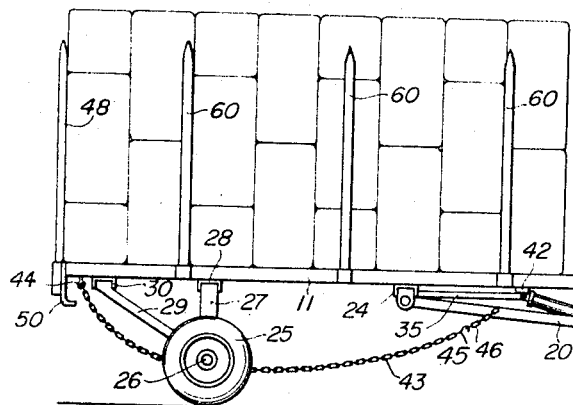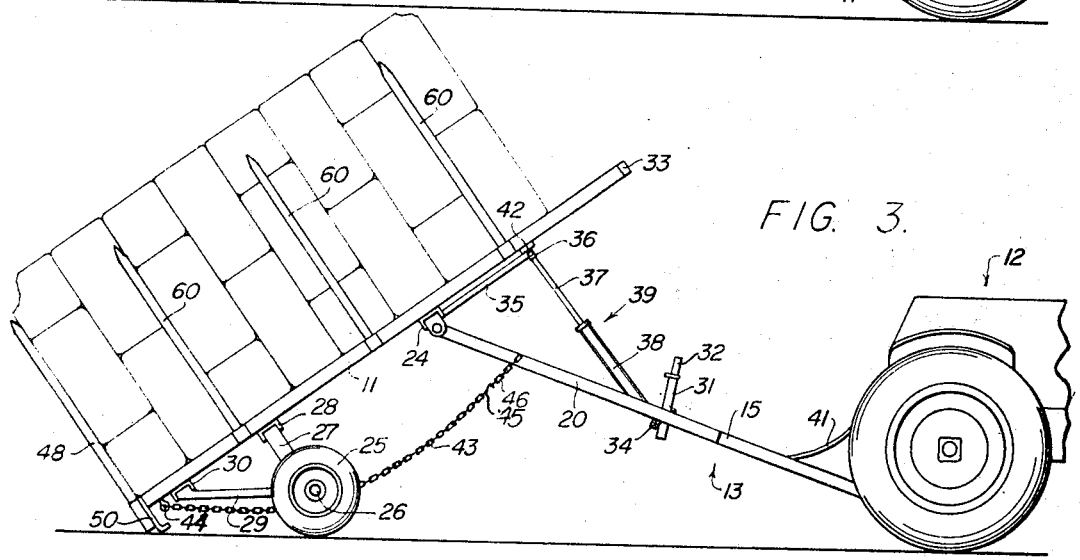

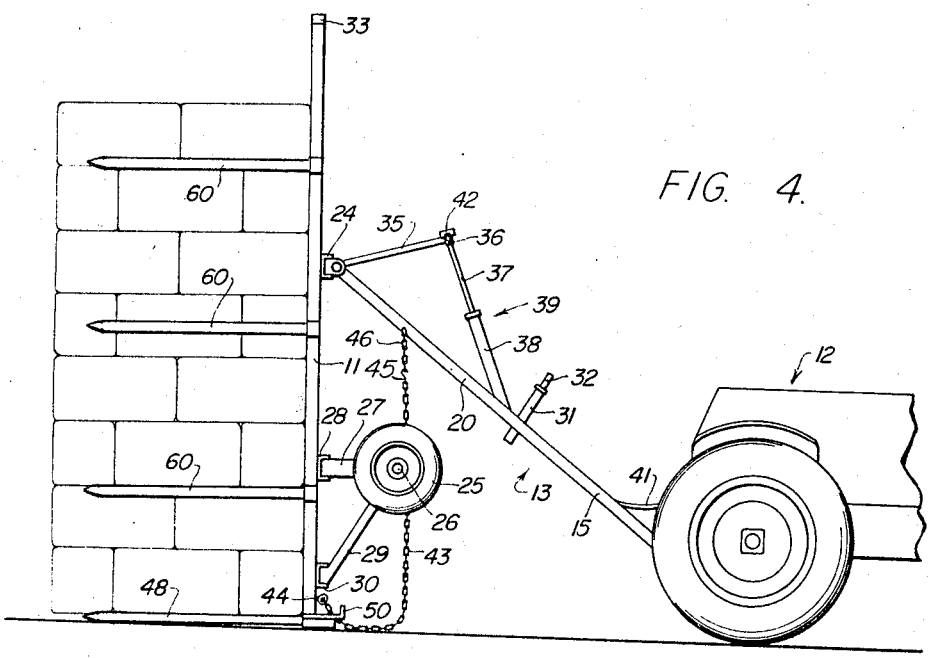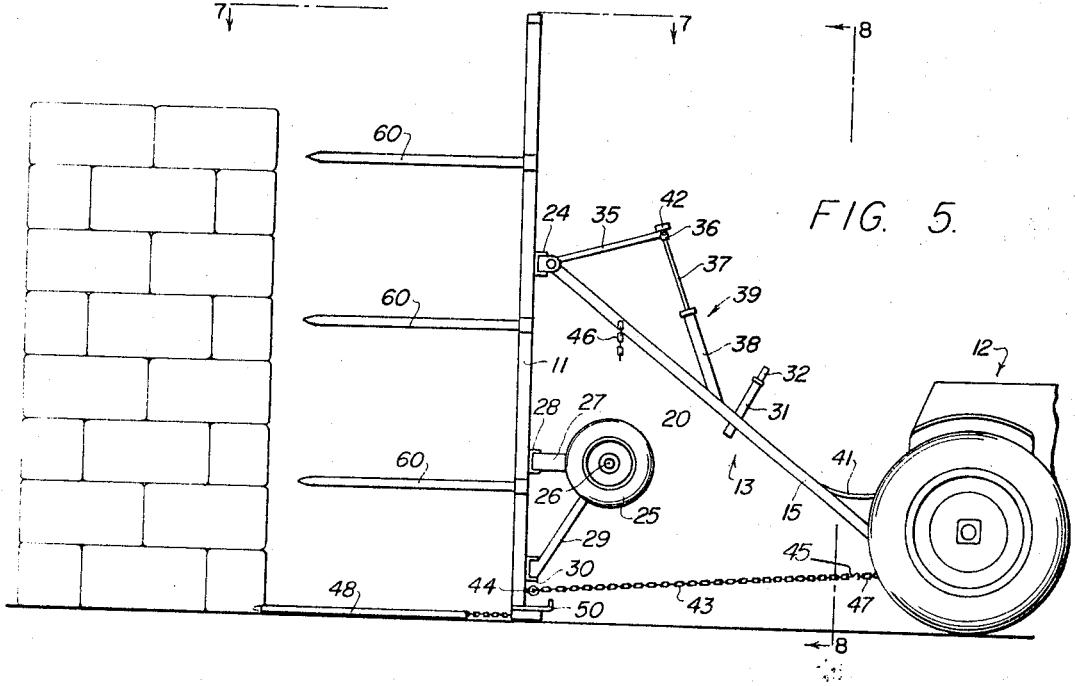

ATTORNEYS.

United States Patent Office 3,450,281
Patented June 17, 1969

3,450,281
METHOD AND APPARATUS FOR STACKING HAY AND THE LIKE
John R. Groberg, Rte. 1, Box 85,
Kaysville, Utah 84037
Filed Oct. 31, 1966, Ser. No. 590,788
Int. Cl. B60p 1/16, 1/22; B65g 57/28
U.S. Cl. 214—352                         12 Claims

ABSTRACT OF THE DISCLOSURE

The present invention involves a method of stacking bales of hay and the like and preferred apparatus for practicing the method. The method consists of placing the bales on a load-carrying bed, tipping the bed to place the rear edge thereof on the ground, backing a prime-mover for the bed to push it to an upended or past vertical position and then pulling the bed away from the bales to leave a standing stack. The apparatus, in its presently most preferred forms includes a wagon bed that can be pulled by a tractor. Means controlled by the tractor operator are provided to tilt the wagon bed until its rearmost edge is in contact with the ground, and pivot connections are provided between the wagon bed and the tractor such that as the tractor is backed the wagon bed is upended to a vertical or past vertical position. Removable tines carried by the wagon bed are adapted to be left under the stack of bales formed when the bed is upended and pulled away from the stack. The tines are connected to the wagon bed by flexible connectors of varying lengths so as to be removed without affecting the stack.

Brief description

This invention relates to the stacking of the hay, straw, and the like and is particularly concerned with methods and apparatus for stacking such material after it has been previously put in bale form.

In the handling of baled hay it has long been conventional to load the bales onto a truck or wagon, haul the bales to a desired stacking area and to then individually move the bales from the truck or wagon to form the stack. Portable conveyors are frequently used to reduce the labor involved, but even with these it is a time consuming and difficult job.

Recently, other apparatus has been proposed for use in the stacking of baled hay. This apparatus has involved the use of dump beds that are pivoted to a full upright vertical or over vertical position, at the rear of an expensive truck bed or frame, solely through the use of special motors and linkage arms or by long fluid operated cylinders. Additional powered structure is then used to slide the hay away from the upright dump bed and the bed is returned to its lowered, loading position by the power structure previously used in raising it.

It is an object of the present invention to provide an improved method of stacking bales of hay and apparatus for performing the method that is inexpensive to construct, easily operated, and capable of handling large, economical loads.

Outstanding features of the presently preferred apparatus used in performing the method of my invention include a wagon bed, adapted to be loaded with bales of hay, that has a drawbar with one of its ends pivotally connected to the underside of the bed, intermediate its length and its other end adapted to be connected to a prime-mover; means for initiating a lifting action on the front end of the loaded bed such that backing of the prime-mover will pivot it about its rear edge to a vertical or past-vertical upended position; and means for moving the upended bed away from the stack of standing hay bales, with supporting tines being individually removed from beneath the stack so as not to upset it, before the bed is again moved to its lowered position.

There are shown in the accompanying drawings specific embodiments of the apparatus of the invention, representing what are presently regarded as the best modes of carrying out the generic concepts in actual practice. From the detailed description of these presently preferred forms of the invention, other more specific objects and features will become apparent.

Figure 6:
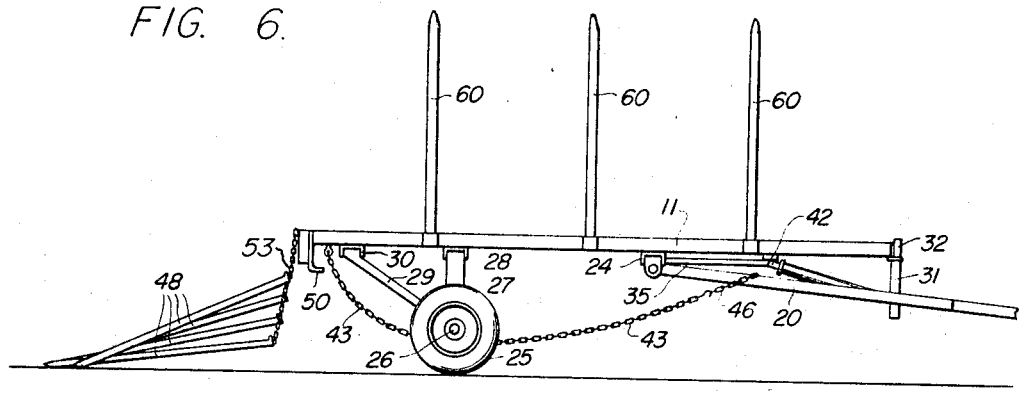
Figure 7:
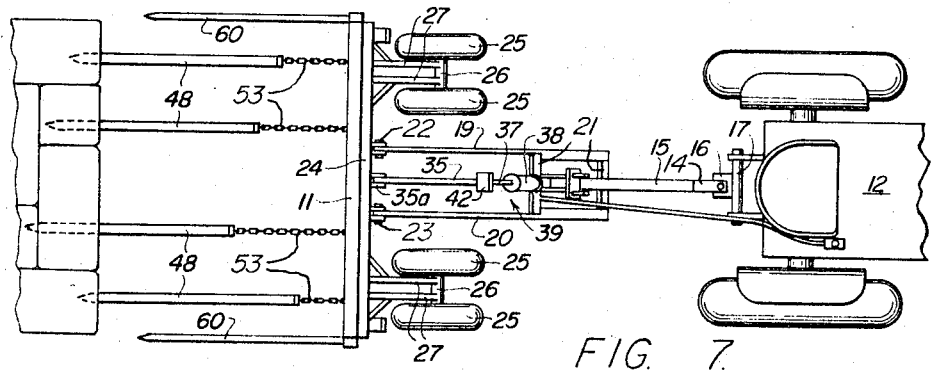
Figure 8:
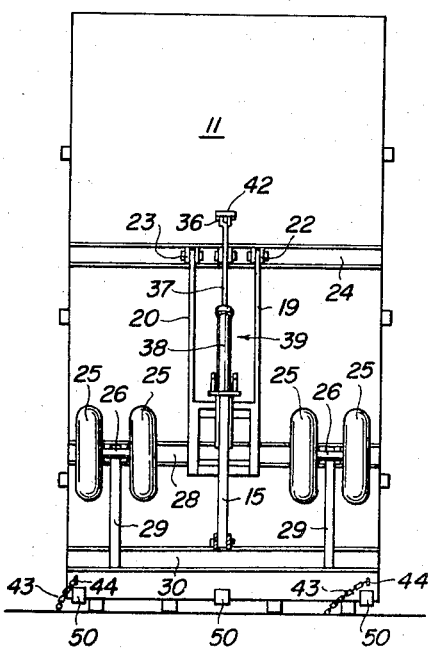
Figure 9:
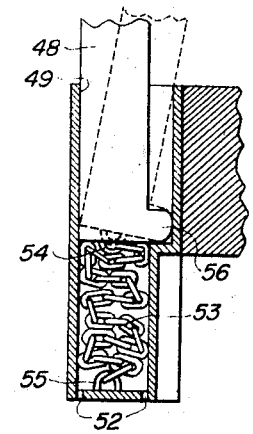

In the drawings:
FIG. 1 is a top plan view of one embodiment of the invention;
FIG. 2, a side elevation view with the wagon bed loaded and in its lowered position, partially broken away for clarity and with a towing tractor, also partially broken away, shown fragmentarily;
FIGS. 3–6 are also side elevation views, but showing the wagon bed in various other positions it assumes during use;
FIG. 7, a top plan view of the wagon, in the unloading position of FIG. 5;
FIG. 8, a vertical section, taken on the line 8—8 of FIG. 5, and showing the undersurface of the wagon bed;
FIG. 9, an enlarged vertical section through a tine pocket, taken on the line 9—9 of FIG. 1; and
FIGS. 10–13, side elevation views showing other embodiments of the invention, and drawn to a slightly smaller scale.

Detailed description

Referring now to the drawings:
In the embodiment illustrated in FIGS. 1–5, the apparatus for stacking hay, shown generally at 10, includes a load-carrying wagon bed 11 that is coupled to the usual tractor, shown fragmentarily at 12, or other such conventional prime mover, by a drawbar 13.

Drawbar 13 includes a clevis 14 on one end of the tongue 15. The clevis is adapted to receive the usual attachment plate 16 of a pivot bar 17 at the rear of the tractor.

The tractor and drawbar can pivot with respect to one another about the axis formed by a pin 18 inserted vertically through clevis 14 and plate 16 and about the horizontal axis formed by pivot bar 17. If the tractor is not equipped with a pivot bar, any suitable double clevis or universal coupling can be employed on the end of the tongue to provide the double pivoting action required for proper trailing of the wagon and for unloading of hay bales, etc. placed thereon.

The other end of tongue 15 is held between ends of legs 19 and 20 that are interconnected by cross-braces 21, and the other ends of the legs 19 and 20 are pivotally connected at 22 and 23, FIGS. 7 and 8, respectively to brackets on a cross-member 24 on the bottom of the wagon bed. The cross-member 24 is located back from the front of the wagon bed approximately one-third of its length.

Approximately two-thirds of the distance back from the front of the wagon bed is the axis for the wagon wheels 25. As illustrated, dual wheels are provided, with a separate axle 26 for each pair of wheels, but any suitable wheel arrangement can be used.

Posts 27 suspend the axles 26 from another cross-member 28 beneath the wagon bed and diagonal reinforcement braces 29 interconnect a similar cross-member 30 on the bottom of the bed.

An upright post 31, FIG. 2, straddles tongue 15 between legs 19 and 20, and has a clevis 32 at its upper end adapted to receive a flange 33 that projects from the front of the wagon bed 11. If desired, a bolt (not shown) can be inserted through clevis 32 and flange 33 to secure them together, in which case the wagon bed is held in its lowered position and the unit performs as a conventional wagon. A clamp 34 holds the upright post 31 to tongue 15 and when the clamp is released the post can be raised, or lowered, before the clamp is again tightened to securely fix the post in a set position.

An arm 35 has one end pivotally connected to a bracket 35a, FIG. 7, on the cross-member 24. The other end of the arm 35 is pivotally connected at 36 to a rod 37 projecting from a housing 38 of a hydraulic cylinder 39. The housing of the cylinder is pivotally connected at 40 to tongue 15, and the fluid supply and exhaust line 41 for the cylinder runs along the tongue to be connected to the hydraulic system (not shown) of tractor 12.

A wear plate 42 on the top of the arm 35 contacts the bottom of the wagon bed when the cylinder 39 is actuated in a manner to be more fully explained.

A chain 43 has its ends anchored at 44, FIG. 8, to the respective rear corners of the underside of the bed 11. Intermediate the length of the chain is a hook 45 that is adapted to be connected to a length of chain 46, except when the wagon is being withdrawn from a hay stack or the like, during which operation it is connected to another length of chain 47.

In operation, the wagon is loaded with layers of baled hay, either manually or using a portable conveyor unit (not shown), with certain of the layers placed transversely to effectively tie the load together in conventional fashion. During this loading operation the flange 33 on the front of the wagon bed is supported by the upright post 31, and the post is preferably positioned to provide a rearward tilt to the bed. Thus, as the bales are loaded they settle firmly against tines 48 projecting upwardly from tine pockets 49, FIG. 9, at the rear of the bed. After the wagon has been loaded it is moved to a stacking location and is unloaded.

To unload the wagon it is only necessary for the tractor operator to actuate the hydraulic cylinder 39 to extend rod 37. This forces wear plate 42 of arm 35 against the bottom of the wagon bed 11 and raises the forward end of the bed until curved plates 50 at the rear of the wagon engage the ground.

As the front of the wagon bed is raised the drawbar 13 pivots about the horizontal axis formed by pivot bar 17 and about the pivot connections 22 and 23.

Once the rod 37 of the hydraulic cylinder has been extended its full length the operator will back the tractor to further raise the front end of the wagon bed until the bed is vertical or is tilted slightly past a vertical position.

The weight of the loaded wagon on the curved plates 50 prevents the wagon skidding as the tractor is backed.

Special tines 48 and tine pockets 49 are provided so that the wagon bed can be tilted beyond the vertical position without damage to the tines. This special construction also allows the wagon bed to be pulled away from the hay bales after the bed is moved to its vertical or over-vertical position, without causing the hay to topple.

Each pocket 49 is made as deep as is required to support a tine and includes a sub-well 52 that will receive a chain 53 having one of its ends connected to the bottom end of the tine, as by an anchor 54. Another anchor 55 securely holds the other end of the chain 53 to the bottom of a sub-well 52.

The upper end of each tine is preferably pointed and the lower end has a curved projection 56 protruding from one face. The pockets are dimensioned such that the tine fits snugly therein, but when the wagon bed is moved to its past-vertical position, in the manner previously described, the curved projections provide pivot surfaces about which the tines can rotate with respect to the wagon bed 11. Thus, movement of the wagon bed slightly past vertical does not damage the tines.

The chains 53 interconnecting the bottoms of the various sub-wells 52 and their tines 48 are preferably each of different length. As the upended wagon bed is pulled away from the hay stack, in a manner to be more fully discussed, the tines are individually withdrawn from beneath the stack and initial withdrawal of each tine is started separately from the initial movement of each other tine. Thus, the tine movement does not tend to pull the bottom bales from the stack or to tip the stack over. Although it is preferred that each chain 53 be of different length from the other chains, some can be of the same length. It is only necessary that the initial movement does not create an inertial drag that will disturb the stacks.

To move the wagon bed 11 away from the hay stack it is only necessary for the central hook 45 of chain 43 to be disconnected from chain 46 and to be reconnected to chain 47 such that the chain 43 is substantially taut. The tractor is driven away from the stack pulling the upended wagon bed along on the curved plates 50 until the tines have all been individually pulled from beneath the stack.

Chain 43 is disconnected from chain 47 and is reconnected to chain 46 such that it will be stored out of the way during continued use of the wagon, and the tractor is driven forward, thus allowing the wagon bed to pivot on the curved plates 50 until the wheels 25 are again on the ground and the bottom of the wagon bed 11 rests on the wear plate 42 fixed to arm 35.

Actuation of hydraulic cylinder 39 to retract rod 37 will then lower the wagon bed until flange 33 rests in clevis 32 of post 31. As is best seen in FIG. 6, when the wagon bed is again in its lowered position the tines are dragged behind where they are easily grasped to be reinserted in the pockets 49 provided therefor. After they have been reinserted the wagon is again ready to be loaded.

As illustrated, spaced stakes 60 can also be inserted in side pockets provided for the purpose, and these stakes will help to maintain the bales in position as the wagon bed is loaded, transported and raised to its upended position and will provide some support for the stack as the wagon is moved away.

Figure 10:
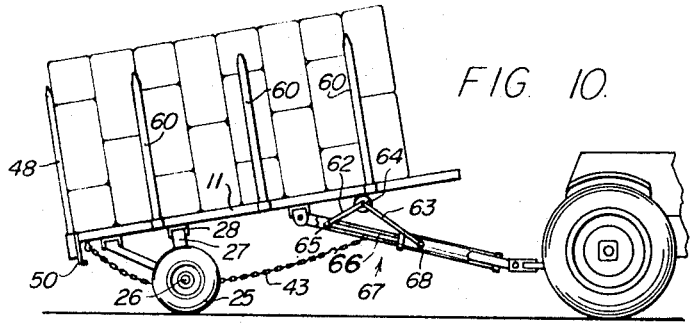

While the pivot arm and hydraulic cylinder above described have proved very effective for initiating raising of the wagon bed and for lowering it back to the upright post 31, other operating structure can be used instead. For example, as is shown in FIG. 10, a pair of linkage arms 62 and 63 having a roller 64 at their pivot connection can be used. Arm 62 is pivotally connected at 65 to the rod 66 of a hydraulic cylinder 67 and the other arm 63 is pivotally connected to the housing 68 of the cylinder.

When the rod is extracted the linkage arms are substantially straight and the wagon bed 11 is lowered. When the rod is retracted the linkage arms fold and the roller 64 engages the bottom of the wagon bed to raise it.

Figure 11:
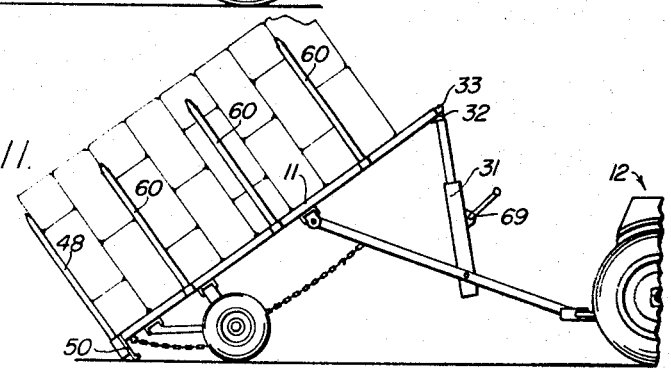

In the event the tractor or other prime mover is not equipped for operation of a hydraulic cylinder, a crank operated winch 69 can be used to initiate lifting of the wagon bed. As is shown in FIG. 11, the winch is mounted to raise a telescoping portion of upright post 31 until the rear of the wagon bed is in engagement with the ground.

Figure 12:
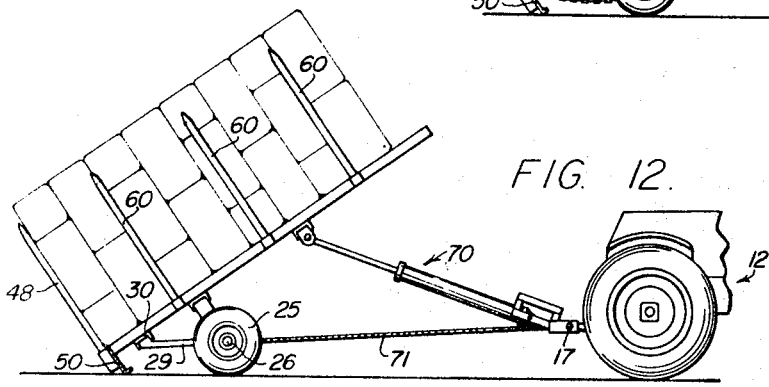

In FIG. 12, there is shown another embodiment of the invention, wherein the wagon tongue is made up of one or more long hydraulic cylinders 70. A cable 71 interconnects the wheel axles 26 and the pivot bar 17 of the tractor. The cable holds the wheels in position as the cylinder rod is extended to tilt the front of the wagon and yields as the tractor is backed to raise the wagon bed to its upended position. The cable also prevents the bed slamming against the cylinder 70 as it is lowered.

Figure 13:
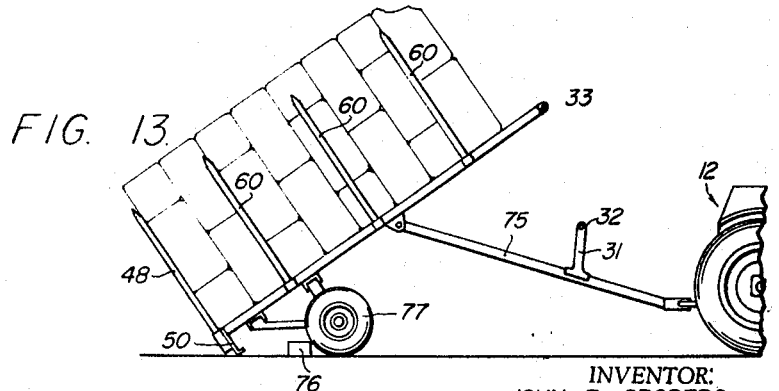

It is also possible to practice the method of the invention with a wagon that is not equipped with hydraulic cylinders or other mechanism for initiating pivoting of the wagon bed. As shown in FIG. 13, a rigid tongue 75 pivotally coupled to the tractor and to the underside of the wagon bed can be used.

In this case brakes or blocks 76 are needed to immobilize the wheels 77 when the wagon is to be unloaded.

Once the blocks have been positioned the operator merely backs the tractor to raise the wagon bed 11 to place its rearmost edge in engagement with the ground. Continued backing will stand the bed on end and will move it past vertical in the manner previously explained.

The wagons shown in FIGS. 10–13 are moved away from the stack in the same manner as is the wagon disclosed with reference to FIGS. 1–9.

While the invention is particularly useful in the stacking of baled hay, straw or similar forage, it can be readily used for all types of hauling. Sideboards can be attached and even loose materials can be carried and easily dumped.

Whereas this invention is here described and illustrated with respect to certain forms thereof, it is to be understood that many variations are possible without departing from the subject matter particularly pointed out in the following claims, which subject matter I regard as my invention.

I claim:
1. A method of stacking baled hay which comprises the steps of
   placing bales of hay on a load-carrying bed in a loading position;
   tilting said bed to place its rearmost edge on the ground;
   backing a prime mover to upend the bed to an at least vertical position;
   withdrawing the said bed from the bales of hay while maintaining it in its substantially upright position; and
   lowering said bed to the loading position.
2. A method according to claim 1, wherein
   the load-carrying bed is tilted to place its rearmost edge on the ground while the prime mover for the bed is held stationary; and
   then backing the prime mover to upend the load-carrying bed.
3. A method according to claim 1, wherein
   the prime mover for the bed is moved to initially tilt the bed until its rearmost edge is on the ground and is then further moved to completely upend the bed.
4. In combination
   a load-carrying bed;
   a tongue having one end pivotally connected to the underside of said bed and adapted to have its other end coupled to a prime mover;
   ground engaging wheels carried by the said bed rearwardly of the pivot connection of the tongue to the bed; and
   means connected to the undersurface of the bed at its rearmost edge and to a location adjacent the other end of the tongue when the bed is upended to an at least vertical position, whereby the bed is held in its said upended position by said tongue and means as the prime mover draws away from a load deposited from the bed.
5. The combination of claim 4, further including
   spaced tines adapted to project upwardly from the load-carrying face of the bed at its rearmost edge;
   pockets carried by said bed and adapted to receive one end of the tines; and
   flexible means interconnecting the ends of the tines adapted to be received by the pockets and the bed, at least some of said flexible means being of different lengths.
6. The combination of claim 5, further including
   means mounting the tines for pivoting movement within the pockets.
7. The combination of claim 5, wherein
   the tines each include a curved projection at their received ends, whereby said tines can rotate in the said pockets without breaking, as the bed is pivoted past vertical.
8. The combination of claim 7, wherein
   the pockets each include a sub-well and the flexible connector connected to the tine adapted to be inserted in each pocket has an end connected to the bottom of the sub-well and is adapted to be positioned therein when the tine is in the pocket.
9. The combination of claim 4, further including means for immobilizing the wheels.
10. The combination of claim 4, further including
    means for pivoting said bed to place the rearmost edge thereof in engagement with the ground, independently of movement of the prime mower.
11. The combination of claim 10, wherein the means for pivoting the bed to place the rearmost edge thereof in engagement with the ground includes
    at least one hydraulic cylinder; and lifting means responsive to actuation of said at least one cylinder to engage the undersurface of said bed, forwardly of the ground engaging wheels.
12. A wagon for use in stacking bales of hay comprising
    a wagon bed;
    a plurality of tines adapted to project upwardly from the rearmost edge of the wagon bed;
    a plurality of spaced pockets formed at the rearmost edge of the wagon bed, each of said pockets being adapted to receive one end of a tine;
    a sub-well in each pocket;
    a plurality of chains, each having one end attached to the bottom of each sub-well and its other end attached to the end of the tine that is adapted to be inserted in the pocket, and at least some of the chains being of different length than the others;
    spaced stake pockets along each side of the wagon bed;
    a plurality of stakes, each adapted to be inserted in a stake pocket;
    a drawbar, including a tongue member having one end adapted to be coupled to a prime mover and legs having one of their ends fixed to the other end of the tongue;
    means pivotally connecting the other ends of the legs to the underside of the wagon bed;
    ground engaging wheels carried by said wagon bed, rearwardly of the means pivotally connecting the other ends of the legs;
    support means extending upwardly from the drawbar and adapted to support the front of the wagon bed;
    means for adjustably connecting the support means to the drawbar;
    a hydraulic cylinder having a housing and a rod;
    means pivotally connecting said hydraulic cylinder housing to said drawbar;
    a pivot arm;
    means pivotally connecting one end of said pivot arm to the underside of the wagon bed;
    means pivotally connecting the hydraulic cylinder rod to the other end of the pivot arm, forwardly of the wheels; and
    means adapted to hydraulically connect said hydraulic cylinder to a hydraulic circuit of a prime mover.

References Cited

UNITED STATES PATENTS

| 611,542 | 9/1898 | Wilson | 214—352 |
| 1,231,794 | 7/1917 | Santel | 214—352 |
| 2,542,795 | 2/1951 | Clement et al. | 298—20 |
| 3,013,682 | 12/1961 | Unruh | 214—501 |

FOREIGN PATENTS 1,218,757  12/1959  France.

ALBERT J. MAKAY, *Primary Examiner.*

U.S. Cl. X.R.

214—353, 501, 152